(12) United States Patent
Yamamoto et al.

(10) Patent No.: US 9,284,215 B2
(45) Date of Patent: *Mar. 15, 2016

(54) GLASS FOR CHEMICAL STRENGTHENING

(71) Applicant: ASAHI GLASS COMPANY, LIMITED, Chiyodu-ku (JP)

(72) Inventors: Hiroyuki Yamamoto, Haibara-gun (JP); Kazuhide Kuno, Haibara-gun (JP)

(73) Assignee: ASAHI GLASS COMPANY, LIMITED, Chiyoda-ku (JP)

( * ) Notice: Subject to any disclaimer, the term of this patent is extended or adjusted under 35 U.S.C. 154(b) by 137 days.

This patent is subject to a terminal disclaimer.

(21) Appl. No.: 14/029,220

(22) Filed: Sep. 17, 2013

(65) Prior Publication Data

US 2014/0113141 A1  Apr. 24, 2014

Related U.S. Application Data

(63) Continuation of application No. PCT/JP2012/056744, filed on Mar. 15, 2012.

(30) Foreign Application Priority Data

Mar. 17, 2011 (JP) ................................. 2011-059661
Mar. 23, 2011 (JP) ................................. 2011-064617

(51) Int. Cl.
| | |
|---|---|
| C03C 3/083 | (2006.01) |
| C03C 3/085 | (2006.01) |
| C03C 3/087 | (2006.01) |
| C03C 21/00 | (2006.01) |
| C03C 3/091 | (2006.01) |
| C03C 3/095 | (2006.01) |
| C03C 3/093 | (2006.01) |
| C03C 4/02 | (2006.01) |

(52) U.S. Cl.
CPC ................. *C03C 3/083* (2013.01); *C03C 3/085* (2013.01); *C03C 3/087* (2013.01); *C03C 3/091* (2013.01); *C03C 3/093* (2013.01); *C03C 3/095* (2013.01); *C03C 4/02* (2013.01); *C03C 21/002* (2013.01); *Y10T 428/264* (2015.01); *Y10T 428/315* (2015.01)

(58) Field of Classification Search
None
See application file for complete search history.

(56) References Cited

U.S. PATENT DOCUMENTS

| | | | |
|---|---|---|---|
| 5,268,335 A | | 12/1993 | Kerko et al. |
| 5,403,789 A | * | 4/1995 | Kerko et al. .................... 501/65 |
| 5,650,365 A | * | 7/1997 | Higby et al. .................... 501/71 |
| 6,518,211 B1 | * | 2/2003 | Bradshaw et al. ............. 501/69 |
| 6,780,803 B2 | * | 8/2004 | Seto et al. ....................... 501/71 |
| 2009/0068404 A1 | | 3/2009 | Akieda et al. |
| 2010/0047521 A1 | * | 2/2010 | Amin et al. .................. 428/141 |
| 2011/0071012 A1 | * | 3/2011 | Kondo et al. ................... 501/71 |

FOREIGN PATENT DOCUMENTS

| | | | | |
|---|---|---|---|---|
| DE | 102004034928 A1 | * | 2/2005 | ............. C03C 3/085 |
| EP | 0 600 302 | | 11/1993 | |
| GB | 1320466 A | * | 6/1973 | |
| JP | 45-16112 | | 6/1970 | |
| JP | 2009-061730 | | 3/2009 | |
| JP | 2010-143790 | | 7/2010 | |

OTHER PUBLICATIONS

Nattermann et al. "4. Mechanical Properties," pp. 184-200 in Optical Properties of Glass, edited by Bach et al. 1998.*
Volf et al., Chemical Approach to Glass, 1984, pp. 398-403 and 477-484.*
International Preliminary Report on Patentability and Written Opinion issued Sep. 26, 2013 in Patent Application No. PCT/JP2012/056744 filed on Mar. 15, 2012.
U.S. Appl. No. 14/029,415, filed Sep. 17, 2013, Yamamoto, et al.
U.S. Appl. No. 13/938,822, filed Jul. 10, 2013, Yamamoto.
International Search Report issued Jun. 19, 2012 in PCT/JP2012/056744 filed Mar. 15, 2012.

* cited by examiner

*Primary Examiner* — David Sample
(74) *Attorney, Agent, or Firm* — Oblon, McClelland, Maier & Neustadt, L.L.P

(57) ABSTRACT

There is provided a glass for chemical strengthening having a gray-based color tone and excelling in characteristics preferred for the purposes of housing or decoration of an electronic device, that is, bubble quality, strength, and light transmittance characteristics. A glass for chemical strengthening contains, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of $\Sigma RO$ (where R represents Mg, Ca, Sr, Ba or Zn), 0% to 1% of $ZrO_2$, 0.01% to 0.2% of $Co_3O_4$, 0.05% to 1% of NiO, and 0.01% to 3% of $Fe_2O_3$.

15 Claims, No Drawings

GLASS FOR CHEMICAL STRENGTHENING

CROSS-REFERENCE TO RELATED APPLICATIONS

This application is a continuation of prior International Application No. PCT/JP2012/056744 filed on Mar. 15, 2012, which is based upon and claims the benefit of priority from Japanese Patent Applications Nos. 2011-059661 filed on Mar. 17, 2011 and 2011-064617 filed on Mar. 23, 2011; the entire contents of all of which are incorporated herein by reference.

FIELD

The present invention relates to a glass for chemical strengthening used for a housing or decoration of an electronic device, for example, a communication device, an information device, and the like portably usable.

BACKGROUND

For a housing or decoration of an electronic device such as a portable phone, a material is appropriately selected from materials such as resin and metal and is used in consideration of various factors such as decorativeness, scratch resistance, workability, and cost.

In recent years, there have been attempts to use, as a material for housing, a glass that has not been used hitherto. According to Patent Reference 1 (JP-A 2009-61730 (KO-KAI)), by forming the housing itself from a glass in an electronic device such as a portable phone, it is possible to exhibit a unique decorative effect with transparency.

The housing or decoration of an electronic device for portable use such as a portable phone is required to have high strength in consideration of breakage by an impact of dropping when in use or contact scratches due to long-term use.

As a method to increase strength of the glass, a method of forming a compressive stress layer on a glass surface is generally known. Representative methods to form the compressive stress layer on a glass surface are an air-cooling tempering method (physical tempering method) and a chemical strengthening method. The air-cooling tempering method (physical tempering method) is performed by rapidly cooling such as air cooling a glass plate surface heated to a temperature near a softening point. On the other hand, the chemical strengthening method is to replace alkali metal ions (typically, Li ions, Na ions) having a smaller ion radius existing on the glass plate surface with alkali ions (typically, Na ions or K ions for Li ions, or K ions for Na ions) having a larger ion radius by ion exchange at temperatures lower than or equal to a glass transition point.

For example, in general, the glass for decoration as described above is often used with a thickness of 2 mm or less. When the air-cooling tempering method is employed for such a thin glass plate, it is difficult to assure a temperature difference between the surface and the inside, and hence it is difficult to form the compressive stress layer. Thus, in the glass after being tempered, the intended high strength characteristic cannot be obtained. Further, in the air-cooling tempering, due to variation in cooling temperature, there is a great concern that the flatness of the glass plate is impaired. The concern that the flatness is impaired is large in a thin glass plate in particular, and there is a possibility of impairing texture aimed by the present invention. From these points, it is preferred that the glass plate be tempered by the latter chemical strengthening method.

Further, in the housing or decoration of an electronic device such as a portable phone, a glass having a dark color tone such as black or gray is widely used which does not strongly emphasize the presence of the device itself, and by which firmness and luxuriousness can be obtained simultaneously. Among others, a gray-based color tone gives a soft impression and makes a stain due to an extraneous matter on the surface less noticeable, and thus is widely applied to a housing or the like of an electronic device.

It has been known that a glass can be chemical strengthened and exhibits a dark color by Patent Reference 2 (JP-B 1970-16112 (KOKOKU)). The glass described in Patent Reference 2 is an aluminosilicate glass containing a high concentration of iron oxide.

SUMMARY

For example, in Patent Reference 2 it has been published that arsenous acid is used as a refining agent. The arsenous acid is an environment-affecting substance whose inverse effects to the environment are concerned not only in manufacturing processes but through the lifecycle of the product.

Accordingly, the inventors of the present invention heated and melted a glass material of the composition disclosed in the example of Patent Reference 2 without adding the arsenous acid, and found that only a glass can be obtained which hardly release bubbles, that is, has a poor refining ability, and hence has many remaining bubbles. Specifically, after a molten glass was casted in a block shape and was sliced into a plate shape and the surface thereof was polished, it was recognized that a large number of pockmark-like dents (hereinafter referred to as "open bubbles") formed by bubbles being cut in the glass is exposed on the polished surface.

For the purposes of housing or decoration of an electronic device as described above, a glass in which open bubbles exist cannot be used due to the demand for improving appearance quality, and thus causes a problem of largely reducing the production yield. There is also a concern that the open bubbles become an origin of crack and decrease the strength.

Further, the housing of an electronic device may be shaped and used not only in a flat plate shape but also in a concave or convex shape. Thus, a glass which is easily press-formed is demanded. Moreover, for the purpose of confirming that it has strength of a certain degree or more in quality management, a compressive stress value of the chemical strengthened glass is measured. However, when the glass has a dark color such as gray, if it is measured with an existing surface stress meter, there is a problem that the measurement light is absorbed by the glass and the measurement of compressive stress value cannot be performed. Accordingly, it is demanded that even such a glass having a gray color tone has transparency of a certain amount or more of light having a wavelength out of the visible range.

It is an object of the present invention to provide a glass for chemical strengthening having a gray-based color tone and excelling in characteristics preferred for the purposes of housing or decoration of an electronic device, that is, bubble quality, strength, and light transmission characteristics.

The present invention provides a glass for chemical strengthening containing, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of $\Sigma RO$ (where R represents Mg, Ca, Sr, Ba or Zn), 0% to 1% of $ZrO_2$, 0.01% to 0.2% of $Co_3O_4$, 0.05% to 1% of NiO, and 0.01% to 3% of $Fe_2O_3$ (hereinafter, it may also be referred to as "a glass for chemical strengthening of the present invention").

Further, there is provided the glass for chemical strengthening of the present invention, containing 0.005% to 3% in total of a color correcting component having at least one metal oxides selected from the group consisting of oxides of Ti, Cu, Ce, Er, Nd, Mn and Se.

Further, there is provided the glass for chemical strengthening of the present invention, containing 0.1% to 1% of $TiO_2$. Further, there is provided the glass for chemical strengthening of the present invention, containing 0.1% to 3% of CuO. Further, there is provided the glass for chemical strengthening of the present invention, containing 0.005% to 2% of a color correcting component having at least one metal oxide selected from the group consisting of oxides of Ce, Er, Nd, Mn and Se.

Further, there is provided the glass for chemical strengthening of the present invention, wherein a content ratio $Co_3O_4/Fe_2O_3$ is 0.01 to 0.5. Further, there is provided the glass for chemical strengthening of the present invention, wherein a content ratio $(SiO_2+Al_2O_3+B_2O_3)/(\Sigma R'_2O$ (where R' represents Na, K or Li)$+CaO+SrO+BaO+Fe_2O_3+Co_3O_4)$ is 3 or more. Further, there is provided the glass for chemical strengthening of the present invention, containing 0.005% to 0.5% of $SO_3$. Further, there is provided the glass for chemical strengthening of the present invention, containing 0.005% to 1% of $SnO_2$.

Further, there is provided the glass for chemical strengthening of the present invention, wherein a relative value of an absorption coefficient at a wavelength of 550 nm to an absorption coefficient at a wavelength of 600 nm, as calculated from a spectral transmittance curve of the glass and a relative value of an absorption coefficient at a wavelength of 450 nm to an absorption coefficient at a wavelength of 600 nm, as calculated from a spectral transmittance curve of the glass are both within a range of 0.7 to 1.2. Further, there is provided the glass for chemical strengthening of the present invention, wherein absolute values of variations $\Delta T$ (550/600) and $\Delta T$ (450/600) calculated from relative values of the absorption coefficients as expressed by the following expressions (1) and (2) are 5% or less:

$$\Delta T(550/600)(\%)=[\{A(550/600)-B(550/600)\}/A(550/600)]\times 100 \quad (1); \text{ and}$$

$$\Delta T(450/600)(\%)=[\{A(450/600)-B(450/600)\}/A(450/600)]\times 100 \quad (2)$$

where in the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light; in the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.

Further, there is provided the glass for chemical strengthening of the present invention, wherein an absolute value of a difference $\Delta a^*$ between chromaticity $a^*$ of reflected light by a D65 light source and chromaticity $a^*$ of reflected light by an F2 light source in an $L^*a^*b^*$ color system, which difference is expressed by following expression (I), and an absolute value of a difference $\Delta b^*$ between chromaticity $b^*$ of reflected light by the D65 light source and chromaticity $b^*$ of reflected light by the F2 light source in the $L^*a^*b^*$ color system, which difference is expressed by following expression (II), are both 1 or less:

$$\Delta a^*=a^* \text{value}(D65 \text{ light source})-a^* \text{value}(F2 \text{ light source}) \quad (I); \text{ and}$$

$$\Delta b^*=b^* \text{value}(D65 \text{ light source})-b^* \text{value}(F2 \text{ light source}) \quad (II).$$

Further, there is provided the glass for chemical strengthening of the present invention, wherein when an indentation is formed by using a Vickers indenter in a mirror-finished surface of a glass plate having a thickness of 1 mm made of the glass for chemical strengthening, a load of the Vickers indenter that causes a crack occurrence rate to be 50% is 150 gf or more.

Further, the present invention provides a chemical strengthened glass obtained by chemical strengthening the above-described glass for chemical strengthening of the present invention, wherein a depth of a surface compressive stress layer formed in a surface of the chemical strengthened glass by the chemical strengthening is 30 μm or more, and a surface compressive stress of the surface compressive stress layer is 550 MPa or more.

DETAILED DESCRIPTION

Hereinafter, suitable embodiments of a glass for chemical strengthening of the present invention will be described. Note that the present invention is not limited to the following embodiments.

A glass for chemical strengthening according to the embodiments contains, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of $\Sigma RO$ (where R represents Mg, Ca, Sr, Ba or Zn), 0% to 1% of $ZrO_2$, 0.01% to 0.2% of $Co_3O_4$, 0.05% to 1% of NiO, and 0.01% to 3% of $Fe_2O_3$. Note that $\Sigma RO$ means the sum of all the RO components i.e. "MgO+CaO+SrO+BaO+ZnO".

Regarding the glass for chemical strengthening according to the embodiments below, the composition will be described using a content expressed in mole percentage unless otherwise particularly stated.

Note that in this specification, the contents of coloring component and color correcting component indicate a converted content given that each component existing in the glass exists as the represented oxide.

For example, "containing 0.01% to 3% of $Fe_2O_3$" means an Fe content given that Fe existing in the glass exists entirely in the form of $Fe_2O_3$, that is, the $Fe_2O_3$-converted content of Fe is 0.01% to 3%.

The glass for chemical strengthening according to the embodiments allows to obtain a gray-based colored glass by containing the above respective predetermined contents of $Co_3O_4$, NiO and $Fe_2O_3$ as coloring components.

For example, a glass for housing purposes may be shaped and used not only in a flat plate shape but also in a concave or convex shape. In this case, a glass formed in a flat plate shape, a block shape, or the like is reheated and press-formed in a molten state, or a molten glass is poured into a press mold and press formed, to be formed in a desired shape.

When the glass is press-formed, it is preferred that the formation temperature of the glass be low during press formation. Generally, when the formation temperature of the glass during press formation is high, a superalloy or ceramics must be used for the mold, but they are poor in workability and also expensive, and hence are not preferable. When the formation temperature of the glass during press formation is high, the progress of degradation of the mold is also accelerated because the mold is used under high temperature. Further, since the glass is made into a soften state at high temperature, a large amount of energy is needed.

The glass for chemical strengthening according to the embodiments contains, in mole percentage based on following oxides, 0.01% to 0.2% of $Co_3O_4$, 0.05% to 1% of NiO, and 0.01% to 3% of $Fe_2O_3$ in the glass, and this allows to lower Tg (glass transition point), which is an indicator of the formation temperature of the glass during press formation. Thus, a glass excellent in press formability can be made, which is suitable for press forming into an appropriate shape such as a concave or convex shape.

To increase the absorption coefficients at wavelengths of 380 nm to 780 nm, it is preferred to make the absorption coefficients for light at these wavelengths be averagely high by combining and blending plural coloring components. By containing 0.01% to 0.2% of $Co_3O_4$, 0.05% to 1% of NiO, and 0.01% to 3% of $Fe_2O_3$ as coloring components, the glass for chemical strengthening according to the embodiments can be made as a glass which has a desired light blocking effect, sufficiently absorbs light in the visible range of wavelengths from 380 nm to 780 nm, and meanwhile averagely absorbs light in the visible range. That is, when it is attempted to obtain a glass exhibiting a gray color tone, depending on the type and blending amount of coloring components, a gray exhibiting brown or blue color may be generated due to the existence of a wavelength range with a low absorption characteristic in the visible range of wavelengths from 380 nm to 780 nm. In this respect, having the above-described coloring components allows to represent a good gray color tone, which is not brownish gray or bluish gray.

Further, by combining coloring components in the glass, a glass can be made that has transparency of light at certain wavelengths, such as ultraviolet light, infrared light, or the like while sufficiently absorbing light in the visible range of wavelengths from 380 nm to 780 nm. By containing $Co_3O_4$, NiO and $Fe_2O_3$ as coloring components, the glass for chemical strengthening according to the embodiments can be made as a glass which can have transparency of ultraviolet light at wavelengths of 300 nm to 380 nm as well as infrared light at wavelengths of 800 nm to 950 nm. For example, the infrared light at wavelengths of 800 nm to 950 nm is utilized in an infrared communication device used in data communication of a portable phone or a portable game device. Accordingly, giving an infrared light transmitting characteristic to a glass by blending the above-described coloring components ($Co_3O_4$, NiO, and $Fe_2O_3$) enables that, when the glass is applied to housing purposes for example, it can be applied without providing an opening for the infrared light communication device in the housing.

It is preferred that the glass for chemical strengthening according to the embodiments contain, as a color correcting component, 0.005% to 3%, more preferably 0.01% to 2.5% in total of at least one metal oxide selected from the group consisting of oxides of Ti, Cu, Ce, Er, Nd, Mn and Se.

By containing 0.005% or more in total of the above-described color correcting components, a difference in absorption characteristic of light within the wavelength range of a visible range can be reduced, thereby allowing to represent a good gray color tone, which is not brownish color tone or bluish color tone in a glass of a gray color tone. On the other hand, when the content of the above-described color correcting components is more than 3%, it is possible that the glass becomes unstable and devitrification occurs.

In view of obtaining a good gray color tone which does not exhibit brownish or bluish color, it is preferred to contain, as the color correcting component, 0.005% to 2%, more preferably 0.01% to 1.5% in total of at least one metal oxide selected from the group consisting of oxides of Ce, Er, Nd, Mn and Se.

As the color correcting component, specifically, for example, $TiO_2$, CuO, $Cu_2O$, $Ce_2O_2$, $Er_2O_3$, $Nd_2O_3$, $MnO_2$ and $SeO_2$ are used preferably.

$SiO_2$ is a component that forms a network former of the glass and hence is essential. When its content is less than 55%, stability as a glass decreases, or weather resistance decreases. Preferably, its content is 61% or more. More preferably, its content is 65% or more. When the content of $SiO_2$ is more than 80%, viscosity of the glass increases, and meltability decreases significantly. Preferably, its content is 75% or less, typically 70% or less.

$Al_2O_3$ is a component that improves weather resistance and chemical strengthening characteristic of the glass and is essential. When its content is less than 3%, the weather resistance decreases. Preferably, its content is 4% or more, typically 5% or more. When the content of $Al_2O_3$ is more than 16%, viscosity of the glass becomes high and uniform melting becomes difficult. Preferably, its content is 14% or less, typically 12% or less.

$B_2O_3$ is a component that improves weather resistance, and is not essential but preferred to be contained. When $B_2O_3$ is contained, if its content is less than 0.01%, it is possible that a significant effect cannot be obtained regarding improvement of the weather resistance. Preferably, its content is 4% or more, typically 5% or more. When the content of $B_2O_3$ is more than 12%, it is possible that striae due to volatilization occur and the yield decreases. Preferably, its content is 11% or less, typically 10% or less.

$Na_2O$ is a component that improves meltability of the glass, and is essential because it causes a surface compressive stress layer to be formed by ion exchange. When its content is less than 5%, the meltability is poor and it is also difficult to form a desired surface compressive stress layer by ion exchange. Preferably, its content is 7% or more, typically 8% or more. The weather resistance decreases when the content of $Na_2O$ is more than 16%. Preferably, its content is 15% or less, typically 14% or less.

$K_2O$ is a component that improves meltability, and has an operation to increase ion exchange speed in chemical strengthening. Thus, this component is not essential but is preferred to be contained. When $K_2O$ is contained, if its content is less than 0.01%, it is possible that a significant effect cannot be obtained regarding improvement of meltability, or that a significant effect cannot be obtained regarding ion exchange speed improvement. Typically, its content is 0.3% or more. When the content of $K_2O$ is more than 4%, weather resistance decreases. Preferably, its content is 3% or less, typically 2% or less.

MgO is a component that improves meltability, and is not essential but can be contained as necessary. When MgO is contained, if its content is less than 3%, it is possible that a significant effect cannot be obtained regarding improvement of meltability. Typically, its content is 4% or more. When the content of MgO is more than 15%, weather resistance decreases. Preferably, its content is 13% or less, typically 12% or less.

CaO is a component that improves meltability and can be contained as necessary. When CaO is contained, if its content is less than 0.01%, a significant effect cannot be obtained regarding improvement of meltability. Typically, its content is 0.1% or more. When the content of CaO is more than 3%, the chemical strengthening characteristic decreases. Preferably, its content is 1% or less, typically 0.5% or less. Practically, it is preferred not to be contained.

RO (where R represents Mg, Ca, Sr, Ba or Zn) is a component that improves meltability and is not essential, but any one or more of them can be contained as necessary. In this case, it is possible that the meltability decreases when the total content of RO (where R represents Mg, Ca, Sr, Ba or Zn), i.e. the content of $\Sigma RO$, is less than 1%. Preferably, its content is 3% or more, typically 5% or more. When the content of $\Sigma RO$ (where R represents Mg, Ca, Sr, Ba or Zn) is more than 18%, weather resistance decreases. Preferably, its content is 15% or less, more preferably 13% or less, typically 11% or less.

$ZrO_2$ is a component that increases ion exchange speed and is not essential, but may be contained within the range 1% or less. When the content of $ZrO_2$ is more than 1%, meltability worsens and there may be cases where it remains as a non-melted matter in the glass. Typically, $ZrO_2$ is not contained.

$Fe_2O_3$ is an essential component for coloring a glass with a deep color. When the total iron content represented by $Fe_2O_3$ is less than 0.01%, a desired gray glass cannot be obtained. Preferably, its content is 0.02% or more, more preferably 0.03% or more. When the content of $Fe_2O_3$ is more than 3%, the color tone of the glass becomes excessively dark, and a desired gray color tone cannot be obtained. Further, the glass becomes unstable and devitrification occurs. Preferably, its content is 2.5% or less, more preferably 2.2% or less.

It is preferred that, among the total iron, the ratio of divalent iron content (iron redox) converted by $Fe_2O_3$ be 10% to 50%, particularly 15% to 40%. Most preferably, the iron redox is 20% to 30%. When the iron redox is less than 10%, decomposition of $SO_3$ does not proceed when $SO_3$ is contained, and it is possible that an expected refining effect cannot be obtained. When the iron redox is more than 50%, decomposition of $SO_3$ proceeds too much before refining, and it is possible that the expected refining effect cannot be obtained, or that it becomes a source of bubbles and increases the number of bubbles.

In this specification, the content of the total iron converted into $Fe_2O_3$ represents the content of $Fe_2O_3$. Regarding the iron redox, the ratio of bivalent iron converted into $Fe_2O_3$ among the total iron converted into $Fe_2O_3$ by a Moessbauer spectroscopy can be represented by percent. Specifically, evaluation is performed with a transmission optical system in which a radiation source ($^{57}Co$), a glass sample (a glass flat plate having a thickness of 3 mm to 7 mm which is cut from the above-described glass block, grinded, and mirror polished), and a detector (45431 made by LND, Inc.) are disposed on a straight line. The radiation source is moved with respect to an axial direction of the optical system, so as to cause an energy change of $\gamma$ ray by a Doppler effect. Then, a Moessbauer absorption spectrum obtained at room temperature is used to calculate the ratio of bivalent Fe to total iron and the ratio of trivalent Fe to total iron, and the ratio of bivalent Fe to total iron is taken as the iron redox.

$Co_3O_4$ is a coloring component for coloring a glass with a deep color, and is a component which exhibits a refining effect while coexisting with iron and is essential. Specifically, $O_2$ bubbles discharged when trivalent iron becomes bivalent iron in a high-temperature state are absorbed when cobalt is oxidized. Consequently the $O_2$ bubbles are reduced, and thus the refining effect is obtained.

Moreover, $Co_3O_4$ is a component that further increases the refining operation when being allowed to coexist with $SO_3$. Specifically, for example, when a sodium sulfate ($Na_2SO_4$) is used as a refining agent, refining from the glass improves by allowing the reaction $SO_3 \rightarrow SO_2 + 1/2 O_2$ to proceed, and thus the oxygen partial pressure in the glass is preferred to be low. By co-adding cobalt to a glass containing iron, release of oxygen occurring due to reduction of iron can be suppressed by oxidation of cobalt, and thus decomposition of $SO_3$ is accelerated. Thus, it is possible to produce a glass with a small bubble defect.

Further, in a glass containing a relatively large amount of alkali metal for chemical strengthening, basicity of the glass increases, $SO_3$ does not decompose easily, and the refining effect decreases. In this manner, in the glass for chemical strengthening in which $SO_3$ does not decompose easily and which contains iron, cobalt accelerates decomposition of $SO_3$, and hence is effective in particular for acceleration of a refining effect.

In order for such a refining operation to occur, the content of $Co_3O_4$ is 0.01% or more, preferably 0.02% or more, typically 0.03% or more. When its content is more than 0.2%, the glass becomes unstable and devitrification occurs. Preferably, its content is 0.18% or less, more preferably 0.15% or less.

When a ratio of a content of $Co_3O_4$ and $Fe_2O_3$, i.e. a content ratio $Co_3O_4/Fe_2O_3$, is less than 0.01, it is possible that the above-described refining effect cannot be obtained. Preferably, the content ratio $Co_3O_4/Fe_2O_3$ is 0.05 or more, typically 0.1 or more. When the content ratio $Co_3O_4/Fe_2O_3$ is more than 0.5, it inversely becomes a source of bubbles, and it is possible that melting down of the glass becomes slow or the number of bubbles increases. Thus, a countermeasure such as using a separate refining agent, or the like needs to be taken. Preferably, the content ratio $Co_3O_4/Fe_2O_3$ is 0.3 or less, more preferably 0.2 or less.

NiO is a coloring component for coloring a glass with a desired gray color tone, and is an essential component. When the content of NiO is less than 0.05%, a desired gray color tone in a glass cannot be contained. Preferably, its content is 0.1% or more, more preferably 0.2% or more. When the content of NiO is more than 1%, brightness of the glass becomes excessively high, and a desired gray color tone cannot be obtained. Further, the glass becomes unstable and devitrification occurs. Preferably, its content is 0.9% or less, more preferably 0.8% or less.

A content ratio $(SiO_2+Al_2O_3+B_2O_3)/(\Sigma R'_2O$ (where R' represents Na, K or Li)$+CaO+SrO+BaO+Fe_2O_3+Co_3O_4)$ means a ratio of a total content of reticulate oxides forming the network of the glass i.e. $SiO_2$, $Al_2O_3$, and $B_2O_3$, and a total content of main modified oxides i.e. $Na_2O$, $K_2O$, $Li_2O$, CaO, SrO, BaO, $Fe_2O_3$, and $Co_3O_4$. Note that $\Sigma R'_2O$ represents the sum of all the $R'_2O$ components i.e. "$Na_2O+K_2O+Li_2O$". When this ratio is less than 3, it is possible that the probability of breakage when an indentation is made after the chemical strengthening becomes large. Preferably, the ratio is 3.6 or more, typically 4 or more. When this ratio is more than 6, viscosity of the glass increases, and meltability of the glass decreases. Preferably, the ratio is 5.5 or less, more preferably 5 or less.

$SO_3$ is a component that operates as a refining agent, and is not essential but can be contained as necessary. When $SO_3$ is contained, an expected refining operation cannot be obtained if its content is less than 0.005%. Preferably, its content is 0.01% or more, more preferably 0.02% or more. Most preferably, its content is 0.03% or more. Further, when its content is more than 0.5%, it inversely becomes a source of bubbles, and it is possible that melting down of the glass becomes slow or the number of bubbles increases. Preferably, its content is 0.3% or less, more preferably 0.2% or less. Most preferably, its content is 0.1% or less.

$SnO_2$ is a component that operates as a refining agent, and is not essential but can be contained as necessary. When $SnO_2$ is contained, an expected refining operation cannot be obtained if its content is less than 0.005%. Preferably, its content is 0.01% or more, more preferably 0.05% or more. Further, when its content is more than 1%, it inversely becomes a source of bubbles, and it is possible that melting down of the glass becomes slow or the number of bubbles increases. Preferably, its content is 0.8% or less, more preferably 0.5% or less. Most preferably, its content is 0.3% or less.

$TiO_2$ is a component that improves weather resistance and adjusts the color tone of the glass to correct the color, and is not essential but can be contained as necessary. When $TiO_2$ is contained, a sufficient color correcting effect cannot be obtained if its content is less than 0.1%, and it is possible that a gray-based glass cannot be prevented sufficiently from exhibiting a bluish gray or brownish gray color. It is also possible that a significant effect cannot be obtained regarding improvement of weather resistance. Preferably, its content is 0.15% or more, typically 0.2% or more. When the content of $TiO_2$ is more than 1%, it is possible that the glass becomes unstable and devitrification occurs. Preferably, its content is 0.8% or less, typically 0.6% or less.

CuO is a component that adjusts the color tone of a glass to correct the color, and is not essential but can be contained as necessary. Further, CuO has an effect to lower metamerism when it is contained in a glass.

The metamerism is an index indicating the degree of a color change of a color tone or an outer color due to color of outside light and can be defined by using the L*a*b* color system standardized by CIE (Commission Internationale de l'Éclairage). The lower the metamerism, the smaller the degree of the color change of the color tone or the outer color due to the color of the outside light. For example, when the metamerism of the glass is high, the color tone becomes greatly different due to an external light source, and the color tone of the glass indoors and the color tone of the glass outdoors differ greatly.

By containing CuO, the glass for chemical strengthening according to the embodiments can make an absolute value of Δa* defined by the following expression (I) and an absolute value of Δb* defined by the following expression (II) both be one or less. This can reduce the difference between a reflected color tone of the glass indoors and a reflected color tone of the glass outdoors.
(i) a difference Δa* between chromaticity a* of reflected light by a D65 light source and chromaticity a* of reflected light by an F2 light source in an L*a*b* color system $$\Delta a^* = a^* \text{value}(D65 \text{ light source}) - a^* \text{value}(F2 \text{ light source}) \quad (I)$$

(ii) a difference Δb* between chromaticity b* of reflected light by a D65 light source and chromaticity b* of reflected light by an F2 light source in an L*a*b* color system $$\Delta b^* = b^* \text{value}(D65 \text{ light source}) - b^* \text{value}(F2 \text{ light source}) \quad (II)$$

When CuO is contained, if its content is less than 0.1%, it is possible that a significant effect cannot be obtained regarding adjustment of color tone or suppression of metamerism. Preferably, its content is 0.2% or more, typically, 0.5% or more. When the content of CuO is more than 3%, it is possible that the glass becomes unstable and devitrification occurs. Preferably, its content is 2.5% or less, typically 2% or less.

In order to reduce the metamerism, Δa* and Δb* in the glass for chemical strengthening are both preferred to be 0.8 or less in absolute value, more preferably 0.6 or less in absolute value. Note that regarding $Fe_2O_3$, when it is contained in the glass, there is an effect to reduce the metamerism similarly to CuO. The content of $Fe_2O_3$ by which the significant effect regarding the metamerism can be obtained is preferably 0.5% to 2%, typically 0.7% to 1.5%.

$Li_2O$ is a component for improving meltability, and is not essential but can be contained as necessary. When $Li_2O$ is contained, it is possible that a significant effect cannot be obtained regarding improvement of meltability if its content is less than 1%. Preferably, its content is 3% or more, typically 6% or more. When the content of $Li_2O$ is more than 15%, it is possible that weather resistance decreases. Preferably, its content is 10% or less, typically 5% or less.

SrO is a component for improving meltability, and is not essential but can be contained as necessary. When SrO is contained, it is possible that a significant effect cannot be obtained regarding improvement of meltability if its content is less than 1%. Preferably, its content is 3% or more, typically 6% or more. When the content of SrO is more than 15%, it is possible that weather resistance and chemical strengthening characteristic decrease. Preferably, its content is 12% or less, typically 9% or less.

BaO is a component for improving meltability, and is not essential but can be contained as necessary. When BaO is contained, it is possible that a significant effect cannot be obtained regarding improvement of meltability if its content is less than 1%. Preferably, its content is 3% or more, typically 6% or more. When the content of BaO is more than 15%, it is possible that weather resistance and chemical strengthening characteristic decrease. Preferably, its content is 12% or less, typically 9% or less.

ZnO is a component for improving meltability, and is not essential but can be contained as necessary. When ZnO is contained, it is possible that a significant effect cannot be obtained regarding improvement of meltability if its content is less than 1%. Preferably, its content is 3% or more, typically 6% or more. When the content of ZnO is more than 15%, it is possible that weather resistance decreases. Preferably, its content is 12% or less, typically 9% or less.

$CeO_2$, $Er_2O_3$, $Nd_2O_3$, $MnO_2$ and $SeO_2$ are color correcting components for adjusting the color tone of the glass, and are not essential but can be contained as necessary. When these color correcting components are contained, if each content is less than 0.005% the effect of adjustment of color tone, that is, color correction cannot be obtained sufficiently, and it is possible that exhibition of, for example, bluish gray or brownish gray color tone cannot be prevented sufficiently. Each content of these color correcting components is preferably 0.05% or more, typically 0.1% or more. When each content of the color correcting components is more than 2%, it is possible that the glass becomes unstable and devitrification occurs. Typically, its content is 1.5% or less.

Note that the type and amount of the above-described color correcting components can be appropriately selected and used depending on the component to be the parent component of each glass.

As the above-described color correcting components, it is preferred that the total content of $TiO_2$, CuO, $Cu_2O$, $CeO_2$, $Er_2O_3$, $Nd_2O_3$, $MnO_2$ and $SeO_2$ be 0.005% to 3%, and it is preferred that the total content of $CeO_2$, $Er_2O_3$, $Nd_2O_3$, $MnO_2$ and $SeO_2$ be 0.005% to 2%. By having the content of the color correcting components in the above-described range, a sufficient color correcting effect can be obtained, and a stable glass can be obtained.

In the glass for chemical strengthening according to the embodiments, Co is a coloring component and is also a refining agent. As the refining agent of the glass, $SO_3$ or $SnO_2$ may be used as necessary, but $Sb_2O_3$, Cl, F, and another component may be contained within the range not impairing the object of the present invention. When such a component is contained, it is preferred that the total content of these components is 1% or less, typically 0.5% or less. Note that $As_2O_3$ is an environment-affecting substance with which inverse effects to the environment are concerned not only in manufacturing processes but through the lifecycle of the product, and hence is not contained.

In the glass for chemical strengthening according to the embodiments, when an indentation is formed by using a Vickers indenter in a mirror-finished surface of a glass plate having a thickness of 1 mm made of the glass for chemical strengthening, a load of the Vickers indenter that causes a crack occurrence rate to be 50% is preferred to be 150 gf or more, more preferably 200 gf or more, furthermore preferably 300 gf or more. When the load of the Vickers indenter is less than 150 gf, a scratch can be easily made during a manufacturing process or while shipping before chemical strengthening, or even when chemical strengthening is performed, desired strength may not be obtained. Note that the method for chemical strengthening the glass for chemical strengthening is not particularly limited as long as it is able to exchange ions between $Na_2O$ at the glass surface and $K_2O$ in a molten salt, but typically a method which will be described later can be applied.

Further, in the glass for chemical strengthening according to the embodiments, the minimum value of the absorption coefficient at wavelengths of 380 nm to 780 nm is preferred to be 1 $mm^{-1}$ or more. The light source of a display device provided inside an electronic device is constituted of one emitting white light such as a light emitting diode, an organic EL, or CCFL. Thus, when the glass for chemical strengthening according to the embodiments is used as the housing of an electronic device, it is necessary to make the minimum value of the absorption coefficient at wavelengths of 380 nm to 780 nm be 1 $mm^{-1}$ or more in the glass so that the white light does not leak to the outside of the device via the glass. The white light is to be recognized as white color by combining light of plural wavelengths in the visible range using a fluorescent material. Accordingly, by making the minimum value of the absorption coefficient at the wavelengths of a visible range of the glass be 1 $mm^{-1}$ or more, the white light is absorbed solely by the glass without separately providing light blocking means, and thus a sufficient light blocking effect as a glass is obtained.

When the minimum value of the absorption coefficient at wavelengths of 380 nm to 780 nm of the glass is less than 1 $mm^{-1}$, even when it is a glass having a sufficient thickness for housing purposes, a desired light blocking effect cannot be obtained, and it is possible that light transmits the glass. Further, when the glass is formed in a concave shape or convex shape, light may transmit a position where the thickness is smallest. When the thickness of the glass is small, the minimum value of the absorption coefficient at wavelengths of 380 nm to 780 nm of the glass is preferred to be 2 $mm^{-1}$ or more, more preferably 3 $mm^{-1}$ or more, furthermore preferably 4 $mm^{-1}$ or more.

The method for calculating the absorption coefficient in this specification is as follows. Both surfaces of a glass plate are mirror polished, and a thickness t is measured. Spectral transmittance T of this glass plate is measured (for example, an ultraviolet, visible, and near-infrared spectrophotometer V-570 made by JASCO Corporation is used). Then an absorption coefficient $\beta$ is calculated using the relational expression $T=10^{-\beta t}$.

Further, in the glass for chemical strengthening according to the embodiments, a relative value of an absorption coefficient at a wavelength of 450 nm to an absorption coefficient at a wavelength of 600 nm, as calculated from a spectral transmittance curve of the glass (hereinafter, it may be referred to as "relative value of absorption coefficient (@450 nm/@600 nm)") and a relative value of an absorption coefficient at a wavelength of 550 nm to an absorption coefficient at a wavelength of 600 nm, as calculated from a spectral transmittance curve of the glass (hereinafter, it may be referred to as "relative value of absorption coefficient (@550 nm/@600 nm)") are both preferred to be within the range of 0.7 to 1.2. As described above, by selecting and blending $Co_3O_4$, NiO and $Fe_2O_3$ as coloring components, a glass exhibiting a gray color tone can be obtained. However, depending on the blending amounts of the respective coloring components, although it is gray, it may become brownish or bluish for example. To represent a desired gray color tone which does not appear to be another color on a glass, a glass in which a variation in absorption coefficient in the wavelength of visible light is small, that is, a glass which averagely absorbs light in the visible range is preferred.

Thus, the relative value of absorption coefficient (@450 nm/@600 nm) and the relative value of absorption coefficient (@550 nm/@600 nm) are both preferred to be within the range of 0.7 to 1.2. When these relative values of absorption coefficients are smaller than 0.7, it is possible that the glass becomes bluish gray. On the other hand, when these relative values of absorption coefficients are larger than 1.2, it is possible that the glass becomes brownish or greenish gray.

Note that regarding the relative values of the absorption coefficients, when the relative value of absorption coefficient (@450 nm/@600 nm) and the relative value of absorption coefficient (@550 nm/@600 nm) both fall within the above-described range, this means that a glass having a gray color tone which does not appear to be another color can be obtained.

Further, in the glass for chemical strengthening according to the embodiments, preferably, absolute values of variations $\Delta T$ (550/600) and $\Delta T$ (450/600) calculated from relative values of the absorption coefficients as expressed by the following expressions (1) and (2) are 5% or less.

$$\Delta T(550/600)(\%)=[\{A(550/600)-B(550/600)\}/A(550/600)]\times 100 \quad (1)$$

$$\Delta T(450/600)(\%)=[\{A(450/600)-B(450/600)\}/A(450/600)]\times 100 \quad (2)$$

In the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light.

In the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.

Note that "B(550/600)" in expression (1) and "relative value of absorption coefficient (@550 nm/@600 nm)" show the same meaning. Also "B (450/600)" in expression (2) and "relative value of absorption coefficient (@450 nm/@600 nm)" show the same meaning.

By the absolute values of variations ΔT (550/600) and ΔT (450/600) calculated from relative values of the absorption coefficients as expressed by the above expressions (1) and (2) being both within the above-described range, variation in absorption characteristic with respect to light at a wavelength of the visible range before and after irradiation of light can be suppressed, and it can be made as a glass in which variation in color tone is suppressed for a long period.

Specifically, in the above expression (1), A(550/600) is a relative value of an absorption coefficient at a wavelength of 550 nm to an absorption coefficient at a wavelength of 600 nm, as calculated from a spectral transmittance curve of the glass after being irradiated with light of a 400 W high pressure mercury lamp for 100 hours from a separation distance of 15 cm to a polished surface of a glass having a thickness of 0.8 mm, which is optically mirror polished on both surfaces, and B(550/600) is a relative value of an absorption coefficient at a wavelength of 550 nm to an absorption coefficient at a wavelength of 600 nm, as calculated from a spectral transmittance curve of the glass before irradiation with the light.

In the above expression (2), A(450/600) is a relative value of an absorption coefficient at a wavelength of 450 nm to an absorption coefficient at a wavelength of 600 nm, as calculated from a spectral transmittance curve of the glass after irradiation with light of a 400 W high-pressure mercury lamp for 100 hours from a separation distance of 15 cm to a polished surface of a glass having a thickness of 0.8 mm, which is optically mirror polished on both surfaces, and B (450/600) is a relative value of an absorption coefficient at a wavelength of 450 nm to an absorption coefficient at a wavelength of 600 nm, as calculated from a spectral transmittance curve of the glass before irradiation with the light.

Further, in the glass for chemical strengthening according to the embodiments, a minimum value of absorbance at wavelengths of 380 nm to 780 nm is preferred to be 0.7 or more. The light source of a display device provided inside an electronic device is constituted of one emitting white light such as a light emitting diode, an organic EL, or CCFL. Thus, when the glass for chemical strengthening according to the embodiments is used as the housing of an electronic device, it is necessary to make the minimum value of absorbance at wavelengths of 380 nm to 780 nm be 0.7 or more so that the white light does not leak to the outside of the device via the glass. The white light is to be recognized as white color by combining light of plural wavelengths in the visible range using a fluorescent material. Accordingly, by making the absorbance at the wavelengths of a visible range of the glass be 0.7 or more, the white light is absorbed solely by the glass without separately providing light blocking means, and thus a sufficient light blocking effect as a glass is obtained.

When the minimum value of the absorbance at wavelengths of 380 nm to 780 nm of the glass is less than 0.7, even when it is a glass having a sufficient thickness for housing purposes, a desired light blocking effect cannot be obtained, and it is possible that light transmits the glass. Further, when the glass is formed in a concave shape or convex shape, light may transmit a position where the thickness is smallest. The minimum value of the absorbance at wavelengths of 380 nm to 780 nm of the glass is preferred to be 0.9 or more, more preferably 1.2 or more, furthermore preferably 1.5 or more.

The method for calculating the absorbance in this specification is as follows. Both surfaces of a glass plate are mirror polished, and a thickness "t" is measured. Spectral transmittance T of this glass plate is measured (for example, an ultraviolet, visible, and near-infrared spectrophotometer V-570 made by JASCO Corporation is used). Then absorbance A is calculated using the relational expression $A=-\log_{10}T$.

Further, the glass for chemical strengthening according to the embodiments is preferred to have radio wave transparency. For example, in the case where the glass for chemical strengthening is applied as the housing of a portable phone or the like which includes a communication element in the device and performs transmission or reception of information using radio waves, when this glass for chemical strengthening has radio wave transparency, decrease in communication sensitivity due to the presence of the glass is suppressed. Regarding the radio wave transparency in the glass for chemical strengthening according to the embodiments, the maximum value of a dielectric loss tangent (tan δ) in the frequency range of 50 MHz to 3.0 GHz is preferred to be 0.02 or less. Preferably, the maximum value of tan δ is 0.015 or less, more preferably 0.01 or less.

The method for manufacturing the glass for chemical strengthening according to the embodiments is not particularly limited. For example, appropriate amounts of various materials are blended, heated to about 1500° C. to about 1600° C. and melted, thereafter made uniform by refining, stirring, or the like, and formed in a plate shape or the like by a known down-draw method, press method, or the like, or casted and formed in a block shape. Then the glass is produced by cutting into a desired size after annealing, and polishing as necessary.

The method for chemical strengthening is not particularly limited as long as it is able to exchange ions between $Na_2O$ in the glass surface layer and $K_2O$ in a molten salt. For example, there is a method to immerse the glass in a heated potassium nitrate ($KNO_3$) molten salt. The condition for forming a chemical strengthened layer i.e. surface compressive stress layer having a desired surface compressive stress on the glass surface is, typically, immersing the glass in a $KNO_3$ molten salt at 400° C. to 550° C. for 2 to 20 hours, although it differs depending on the thickness of the glass. Further, this $KNO_3$ molten salt may be one containing, for example, about 5% or less $NaNO_3$ besides the $KNO_3$.

The glass for chemical strengthening according to the embodiments is formed in a desired shape by the above-described manufacturing method. Further, to the glass for chemical strengthening according to the embodiments, for example after it is formed in the desired shape, the above-described method of chemical strengthening can be applied to produce a chemical strengthened glass. At this time, the depth of the surface compressive stress layer formed by the chemical strengthening is 6 μm to 70 μm. The reason of this is as follows.

In manufacturing of glasses used for decorative purposes, the surface of a glass may be polished, and the grain diameter of abrasive grain used for polishing in the final stage thereof is typically 2 μm to 6 μm. By such abrasive grain, in the glass surface, it is conceivable that a micro-crack of 5 μm at most is finally formed. To make the strength improving effect by chemical strengthening be effective, it is necessary that a surface compressive stress layer deeper than the micro-crack formed in the glass surface is formed. Accordingly, the depth of the surface compressive stress layer formed due to chemical strengthening is 6 μm or more. Further, a scratch beyond the depth of the surface compressive stress layer being made when in use leads to breakage of the glass, and thus the surface compressive stress layer is preferred to be thick. Accordingly, the depth of the surface compressive stress layer is more preferably 10 μm or more, furthermore preferably 20 μm or more, typically 30 μm or more.

On a soda lime glass, by chemical strengthening by applying the above-described chemical strengthening method, the surface compressive stress of the surface compressive stress layer formed on the glass surface can be 550 MPa or more, but it is not easy to form the depth of the surface compressive stress layer to be 30 μm or more. The glass for chemical strengthening according to the embodiments allows to form the surface compressive stress layer having a depth of 30 μm or more by chemical strengthening.

On the other hand, when the surface compressive stress layer is too deep, the internal tensile stress becomes large, and the impact at the time of breakage becomes large. Specifically, when the internal tensile stress is large, it is known that the glass tends to be small pieces and scatters when it breaks, making it more hazardous. As a result of experiment by the present inventors, it was found that in a glass having a thickness of 2 mm or less, when the depth of the surface compressive stress layer is more than 70 μm, scattering at the time of breakage becomes significant. Therefore, in the glass for chemical strengthening according to the embodiments, the depth of the surface compressive stress layer is 70 μm or less. When it is used as a glass for decoration, although depending on its purpose, for example, when it is applied to a purpose such as a portable device having a high probability of receiving a contact scratch on its surface, it is conceivable to make the depth of the surface compressive stress layer thin in view of safety, as compared to an operating panel of amounting type apparatus such as audiovisual apparatus or office automation apparatus. In this case, the depth of the surface compressive stress layer is more preferably 60 μm or less, furthermore preferably 50 μm or less, typically 40 μm or less.

Further, the glass for chemical strengthening according to the embodiments allows to obtain a chemical strengthened glass by performing chemical strengthening as described above, and the surface compressive stress of the surface compressive stress layer formed on the glass surface is preferably 550 MPa or more, more preferably 700 MPa or more. Further, the surface compressive stress of the surface compressive stress layer is typically 1200 MPa or less.

The glass for chemical strengthening according to the embodiments allows to form the surface compressive stress layer having surface compressive stress of 550 MPa or more on the glass surface by performing chemical strengthening.

In the foregoing, the examples of the glass for chemical strengthening according to the embodiments have been described, but the formation can be appropriately changed as necessary within a limit that does not go against the spirit of the present invention.

EXAMPLES

Hereinafter, the present invention will be described in detail based on examples, but the invention is not limited to these examples.

Regarding Examples 1 to 41 of Table 1 to Table 5 (Examples 1 to 37 are working examples, Example 38 is a comparative example, and Examples 39 to 41 are references), generally used glass materials such as oxides, hydroxides, carbonates, nitrate salts, and the like were selected appropriately and measured to be 100 ml as a glass so that they are in compositions expressed in mole percentage in the tables. Note that $SO_3$ described in the tables is residual $SO_3$ remaining in the glass after sodium sulfate ($Na_2SO_4$) is added to the glass materials and after the sodium sulfate is decomposed, and is a calculated value. Note that $CoO(Co_3O_4)$ in the tables means the content of cobalt oxide as $Co_3O_4$.

Next, this material mixture was put into a melting pot made of platinum, placed in a resistance-heating electric furnace at 1500° C. to 1600° C., and after heated for about 0.5 hour and the materials were melted down, it was melted for one hour to refine. Thereafter, it was poured into a mold material preheated to approximately 630° C., which is about 50 mm length, about 100 mm width, and about 20 mm high, and annealed at the rate of about 1° C./min, thereby obtaining a glass block. This glass block was cut, and after the glass was cut out so that it has a size of 40 mm×40 mm and a thickness as illustrated in Tables 1 to 5, it was grinded and finally mirror polished on both surfaces, thereby obtaining a plate-shaped glass.

For the plate-shaped glass obtained, the minimum value of the absorption coefficient at wavelengths of 380 nm to 780 nm, relative values of absorption coefficients (relative value of absorption coefficient (@550 nm/@600 nm) and relative value of absorption coefficient (@450 nm/@600 nm)), absorbance and glass plate thickness "t" are described together in Tables 1 to 5. Note that "-" in Tables 1 to 5 indicates that it is not measured.

TABLE 1

| [mol %] | E1 | E2 | E3 | E4 | E5 | E6 | E7 | E8 | E9 |
| --- | --- | --- | --- | --- | --- | --- | --- | --- | --- |
| $SiO_2$ | 63.8 | 64.0 | 63.69 | 63.54 | 63.48 | 63.42 | 63.69 | 63.8 | 63.22 |
| $Na_2O$ | 12.41 | 12.44 | 12.38 | 12.35 | 12.34 | 12.33 | 12.38 | 12.4 | 12.29 |
| $K_2O$ | 3.97 | 3.98 | 3.97 | 3.95 | 3.95 | 3.94 | 3.96 | 3.97 | 3.93 |
| MgO | 0 | 10.45 | 10.42 | 10.38 | 10.37 | 10.36 | 10.4 | 10.42 | 10.32 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.94 | 7.96 | 7.94 | 7.91 | 7.9 | 7.89 | 7.92 | 7.94 | 7.87 |
| $TiO_2$ | 0 | 0 | 0.25 | 0 | 0 | 0 | 0.5 | 0.25 | 0.25 |
| $ZrO_2$ | 0.5 | 0.5 | 0.5 | 0.49 | 0.49 | 0.49 | 0.5 | 0.42 | 0.49 |
| $CeO_2$ | 0 | 0 | 0 | 0 | 0 | 0 | 0 | 0 | 0 |
| CoO ($Co_3O_4$) | 0.07 | 0.07 | 0.06 | 0.04 | 0.04 | 0.04 | 0.06 | 0.05 | 0.05 |
| $Fe_2O_3$ | 0.015 | 0.02 | 0.018 | 1.14 | 1.14 | 1.13 | 0.01 | 0.018 | 1.03 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.75 | 0.5 | 0.74 | 0.1 | 0.2 | 0.3 | 0.5 | 0.65 | 0.44 |

TABLE 1-continued

| [mol %] | E1 | E2 | E3 | E4 | E5 | E6 | E7 | E8 | E9 |
|---|---|---|---|---|---|---|---|---|---|
| $MnO_2$ | 0 | 0 | 0 | 0 | 0 | 0 | 0 | 0 | 0 |
| CuO | 0 | 0 | 0 | 0 | 0 | 0 | 0 | 0 | 0 |
| $Co_3O_4/Fe_2O_3$ | 4.67 | 3.50 | 3.33 | 0.04 | 0.04 | 0.04 | 6.00 | 2.78 | 0.05 |
| $(SiO_2 + Al_2O_3 + B_2O_3)/$ $(\Sigma R'_2O + CaO + SrO + BaO + Co_3O_4 + Fe_2O_3)$ | 4.36 | 4.36 | 4.36 | 4.09 | 4.09 | 4.09 | 4.36 | 4.36 | 4.11 |
| Absorption coefficient [$mm^{-1}$] (minimum value at wavelengths of 380 nm to 780 nm) | 0.096 | 0.076 | 0.088 | 0.337 | 0.357 | 0.361 | 0.083 | 0.090 | 0.350 |
| Relative value of absorption coefficient (@550 nm/@600 nm) | 0.771 | 0.701 | 0.813 | 0.667 | 0.720 | 0.757 | 0.739 | 0.817 | 0.794 |
| Relative value of absorption coefficient (@450 nm/@600 nm) | 0.857 | 0.654 | 0.956 | 0.668 | 0.824 | 0.944 | 0.752 | 0.933 | 0.966 |
| Plate thickness (mm) | 7.4 | 9.4 | 8.4 | 2.1 | 3.1 | 2.9 | 9.1 | 8.0 | 3.2 |
| Absorbance | 0.71 | 0.72 | 0.74 | 0.80 | 1.11 | 1.04 | 0.75 | 0.72 | 1.11 |

E1 to E9 = Example 1 to Example 9

TABLE 2

| [mol %] | E10 | E11 | E12 | E13 | E14 | E15 | E16 | E17 | E18 |
|---|---|---|---|---|---|---|---|---|---|
| $SiO_2$ | 63.0 | 63.19 | 64.8 | 63.31 | 63.39 | 63.48 | 64.08 | 64.4 | 64.97 |
| $Na_2O$ | 12.25 | 12.28 | 13.79 | 12.31 | 12.78 | 12.34 | 13.63 | 13.7 | 13.82 |
| $K_2O$ | 3.92 | 3.93 | 3.94 | 3.94 | 3.93 | 3.95 | 3.9 | 3.91 | 3.95 |
| MgO | 10.29 | 10.32 | 7.39 | 10.34 | 9.34 | 10.37 | 7.3 | 7.34 | 7.4 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.84 | 7.86 | 7.88 | 7.88 | 7.86 | 7.9 | 7.79 | 7.83 | 7.9 |
| $TiO_2$ | 0.73 | 0.49 | 0.25 | 0.25 | 0.25 | 0.25 | 0.24 | 0.24 | 0.25 |
| $ZrO_2$ | 0.49 | 0.49 | 0.42 | 0.49 | 0.42 | 0.42 | 0.41 | 0.42 | 0.42 |
| $CeO_2$ | 0 | 0 | 0 | 0 | 0 | 0 | 0 | 0 | 0 |
| CoO ($Co_3O_4$) | 0.06 | 0.06 | 0.06 | 0.06 | 0.04 | 0.05 | 0.05 | 0.05 | 0.05 |
| $Fe_2O_3$ | 1.03 | 1.03 | 1.03 | 1.03 | 0.025 | 0.015 | 0.02 | 0.01 | 0.025 |
| $Er_2O_3$ | 0 | 0 | 0 | 0 | 0 | 0 | 0 | 0 | 0 |
| $Nd_2O_3$ | 0 | 0 | 0 | 0 | 0 | 0 | 0 | 0 | 0 |
| $SO_3$ | 0.1 | 0.1 | 0.1 | 0.1 | 0.1 | 0.1 | 0.1 | 0.1 | 0.1 |
| NiO | 0.29 | 0.25 | 0.34 | 0.3 | 0.61 | 0.65 | 0.54 | 0.54 | 0.55 |
| $MnO_2$ | 0 | 0 | 0 | 0 | 0 | 0 | 0 | 0 | 0 |
| CuO | 0 | 0 | 0 | 0 | 0.98 | 0.49 | 1.95 | 1.47 | 0.59 |
| $Co_3O_4/Fe_2O_3$ | 0.06 | 0.06 | 0.06 | 0.06 | 1.60 | 3.33 | 2.50 | 5.00 | 2.00 |
| $(SiO_2 + Al_2O_3 + B_2O_3)/$ $(\Sigma R'_2O + CaO + SrO + BaO + Co_3O_4 + Fe_2O_3)$ | 4.10 | 4.11 | 3.86 | 4.11 | 4.25 | 4.36 | 4.08 | 4.09 | 4.08 |
| Absorption coefficient [$mm^{-1}$] (minimum value at wavelengths of 380 nm to 780 nm) | 0.342 | 0.331 | 0.340 | 0.322 | 0.308 | 0.184 | 0.492 | 0.373 | 0.149 |
| Relative value of absorption coefficient (@550 nm/@600 nm) | 0.725 | 0.702 | 0.738 | 0.703 | 0.791 | 0.807 | 0.757 | 0.769 | 0.784 |
| Relative value of absorption coefficient (@450 nm/@600 nm) | 0.842 | 0.753 | 0.634 | 0.773 | 0.874 | 0.956 | 0.666 | 0.670 | 0.632 |
| Plate thickness (mm) | 2.9 | 3.6 | 2.5 | 3.1 | 2.4 | 3.9 | 3.0 | 3.1 | 4.7 |
| Absorbance | 0.99 | 1.20 | 0.85 | 0.99 | 0.75 | 0.71 | 1.50 | 1.15 | 0.70 |

E10 to E18 = Example 10 to Example 18

TABLE 3

| [mol %] | E19 | E20 | E21 | E22 | E23 | E24 | E25 | E26 | E27 |
|---|---|---|---|---|---|---|---|---|---|
| $SiO_2$ | 62.63 | 63.17 | 64.84 | 64.65 | 64.08 | 63.43 | 63.68 | 63.13 | 63.44 |
| $Na_2O$ | 12.18 | 12.28 | 13.8 | 13.75 | 13.63 | 12.53 | 12.78 | 12.27 | 12.33 |
| $K_2O$ | 3.9 | 3.93 | 3.94 | 3.93 | 3.90 | 3.93 | 3.93 | 3.93 | 3.95 |
| MgO | 10.23 | 10.32 | 7.39 | 7.37 | 7.30 | 9.83 | 9.34 | 10.31 | 10.36 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| $Al_2O_3$ | 7.79 | 7.86 | 7.88 | 7.86 | 7.79 | 7.86 | 7.86 | 7.85 | 7.89 |
| $TiO_2$ | 0.24 | 0.25 | 0.25 | 0.25 | 0.24 | 0.25 | 0.25 | 0.25 | 0.25 |
| $ZrO_2$ | 0.41 | 0.42 | 0.42 | 0.42 | 0.41 | 0.42 | 0.42 | 0.49 | 0.49 |

TABLE 3-continued

| [mol %] | E19 | E20 | E21 | E22 | E23 | E24 | E25 | E26 | E27 |
|---|---|---|---|---|---|---|---|---|---|
| CeO$_2$ | 0 | 0 | 0 | 0 | 0 | 0 | 0 | 0.98 | 0.49 |
| CoO (Co$_3$O$_4$) | 0.03 | 0.05 | 0.05 | 0.05 | 0.05 | 0.05 | 0.04 | 0.05 | 0.05 |
| Fe$_2$O$_3$ | 0.03 | 0.016 | 0.021 | 0.015 | 0.022 | 0.013 | 0.01 | 0.012 | 0.012 |
| Er$_2$O$_3$ | 0 | 0 | 0 | 0 | 0 | 0 | 0 | 0 | 0 |
| Nd$_2$O$_3$ | 0 | 0 | 0 | 0 | 0 | 0 | 0 | 0 | 0 |
| SO$_3$ | 0.1 | 0.1 | 0.1 | 0.1 | 0.1 | 0.1 | 0.1 | 0.1 | 0.1 |
| NiO | 0.54 | 0.64 | 0.55 | 0.64 | 0.54 | 0.63 | 0.62 | 0.64 | 0.65 |
| MnO$_2$ | 0 | 0 | 0 | 0 | 0 | 0 | 0 | 0 | 0 |
| CuO | 1.95 | 0.98 | 0.79 | 0.98 | 1.95 | 0.98 | 0.98 | 0 | 0 |
| Co$_3$O$_4$/Fe$_2$O$_3$ | 1.00 | 3.13 | 2.38 | 3.33 | 2.27 | 3.85 | 4.00 | 4.17 | 4.17 |
| (SiO$_2$ + Al$_2$O$_3$ + B$_2$O$_3$)/ (ΣR'$_2$O + CaO + SrO + BaO + Co$_3$O$_4$ + Fe$_2$O$_3$) | 4.36 | 4.36 | 4.08 | 4.09 | 4.08 | 4.31 | 4.27 | 4.36 | 4.36 |
| Absorption coefficient [mm$^{-1}$] (minimum value at wavelengths of 380 nm to 780 nm) | 0.717 | 0.349 | 0.188 | 0.247 | 0.543 | 0.325 | 0.307 | 0.125 | 0.121 |
| Relative value of absorption coefficient (@550 nm/@600 nm) | 0.774 | 0.771 | 0.779 | 0.797 | 0.745 | 0.779 | 0.801 | 0.821 | 0.816 |
| Relative value of absorption coefficient (@450 nm/@600 nm) | 0.992 | 0.901 | 0.626 | 0.696 | 0.649 | 0.888 | 0.902 | 1.046 | 1.014 |
| Plate thickness (mm) | 1.7 | 3.1 | 4.5 | 3.6 | 2.1 | 2.3 | 3.3 | 3.1 | 2.9 |
| Absorbance | 1.23 | 1.08 | 0.84 | 0.89 | 1.14 | 0.75 | 1.02 | 1.11 | 1.04 |

E19 to E27 = Example 19 to Example 27

TABLE 4

| [mol %] | E28 | E29 | E30 | E31 | E32 | E33 | E34 | E35 | E36 |
|---|---|---|---|---|---|---|---|---|---|
| SiO$_2$ | 63.59 | 63.03 | 62.97 | 63.12 | 63.2 | 63.12 | 63.22 | 63.25 | 63.27 |
| Na$_2$O | 12.36 | 12.25 | 12.24 | 12.27 | 12.29 | 12.27 | 12.29 | 12.3 | 12.3 |
| K$_2$O | 3.96 | 3.92 | 3.92 | 3.93 | 3.93 | 3.93 | 3.93 | 3.93 | 3.94 |
| MgO | 10.38 | 10.29 | 10.28 | 10.31 | 10.32 | 10.31 | 10.32 | 10.33 | 10.33 |
| CaO | 0 | 0 | 0 | 0 | 0 | 0 | 0 | 0 | 0 |
| BaO | 0 | 0 | 0 | 0 | 0 | 0 | 0 | 0 | 0 |
| SrO | 0 | 0 | 0 | 0 | 0 | 0 | 0 | 0 | 0 |
| Al$_2$O$_3$ | 7.91 | 7.84 | 7.83 | 7.85 | 7.86 | 7.85 | 7.87 | 7.87 | 7.87 |
| TiO$_2$ | 0.25 | 0.25 | 0.24 | 0.25 | 0.25 | 0.25 | 0.25 | 0.25 | 0.25 |
| ZrO$_2$ | 0.49 | 0.49 | 0.49 | 0.49 | 0.49 | 0.49 | 0.49 | 0.49 | 0.49 |
| CeO$_2$ | 0.25 | 0 | 0 | 0 | 0 | 0 | 0 | 0 | 0 |
| CoO (Co$_3$O$_4$) | 0.05 | 0.06 | 0.06 | 0.06 | 0.06 | 0.06 | 0.06 | 0.06 | 0.06 |
| Fe$_2$O$_3$ | 0.02 | 1.03 | 1.03 | 1.03 | 1.03 | 1.03 | 1.03 | 1.03 | 1.03 |
| Er$_2$O$_3$ | 0 | 0.39 | 0 | 0 | 0 | 0 | 0 | 0 | 0 |
| Nd$_2$O$_3$ | 0 | 0 | 0.49 | 0.25 | 0.12 | 0 | 0 | 0 | 0 |
| SO$_3$ | 0.1 | 0.1 | 0.1 | 0.1 | 0.1 | 0.1 | 0.1 | 0.1 | 0.1 |
| NiO | 0.65 | 0.34 | 0.34 | 0.34 | 0.34 | 0.34 | 0.34 | 0.34 | 0.34 |
| MnO$_2$ | 0 | 0 | 0 | 0 | 0 | 0.25 | 0.1 | 0.05 | 0.01 |
| CuO | 0 | 0 | 0 | 0 | 0 | 0 | 0 | 0 | 0 |
| Co$_3$O$_4$/Fe$_2$O$_3$ | 2.50 | 0.06 | 0.06 | 0.06 | 0.06 | 0.06 | 0.06 | 0.06 | 0.06 |
| (SiO$_2$ + Al$_2$O$_3$ + B$_2$O$_3$)/ (ΣR'$_2$O + CaO + SrO + BaO + Co$_3$O$_4$ + Fe$_2$O$_3$) | 4.36 | 4.11 | 4.10 | 4.10 | 4.11 | 4.10 | 4.11 | 4.11 | 4.11 |
| Absorption coefficient [mm$^{-1}$] (minimum value at wavelengths of 380 nm to 780 nm) | 0.115 | 0.347 | 0.348 | 0.346 | 0.356 | 0.340 | 0.339 | 0.342 | 0.349 |
| Relative value of absorption coefficient (@550 nm/@600 nm) | 0.825 | 0.735 | 0.690 | 0.707 | 0.716 | 0.746 | 0.744 | 0.722 | 0.734 |
| Relative value of absorption coefficient (@450 nm/@600 nm) | 1.005 | 0.850 | 0.810 | 0.825 | 0.822 | 0.849 | 0.831 | 0.827 | 0.830 |
| Plate thickness (mm) | 6.3 | 2.8 | 2.7 | 2.9 | 2.5 | 2.8 | 2.9 | 2.9 | 2.5 |
| Absorbance | 0.73 | 0.97 | 0.94 | 1.01 | 0.89 | 0.96 | 0.97 | 0.99 | 0.87 |

E28 to E36 = Example 28 to Example 36

TABLE 5

| [mol %] | E37 | E38 | E39 | E40 | E41 |
|---|---|---|---|---|---|
| SiO$_2$ | 63.72 | 72.0 | 61.8 | 62.1 | 63.9 |
| Na$_2$O | 12.39 | 12.6 | 12.0 | 12.1 | 12.4 |
| K$_2$O | 3.96 | 0.2 | 3.9 | 3.8 | 4.0 |
| MgO | 10.4 | 5.5 | 10.1 | 10.1 | 10.4 |
| CaO | 0 | 8.6 | 0 | 0 | 0 |
| BaO | 0 | 0 | 0 | 0 | 0 |
| SrO | 0 | 0 | 0 | 0 | 0 |
| Al$_2$O$_3$ | 7.93 | 1.1 | 7.7 | 7.7 | 8.0 |
| TiO$_2$ | 0.25 | 0 | 0 | 0 | 0 |
| ZrO$_2$ | 0.5 | 0 | 0.5 | 0.5 | 0.5 |

TABLE 5-continued

| [mol %] | E37 | E38 | E39 | E40 | E41 |
|---|---|---|---|---|---|
| $CeO_2$ | 0 | 0 | 0 | 0 | 0 |
| CoO ($Co_3O_4$) | 0.04 | 0 | 0.38 | 0 | 0.4 |
| $Fe_2O_3$ | 0.25 | 0 | 3.2 | 3.2 | 0 |
| $Er_2O_3$ | 0 | 0 | 0 | 0 | 0 |
| $Nd_2O_3$ | 0 | 0 | 0 | 0 | 0 |
| $SO_3$ | 0.1 | 0 | 0.38 | 0.38 | 0.39 |
| NiO | 0.46 | 0 | 0 | 0 | 0 |
| $MnO_2$ | 0 | 0 | 0 | 0 | 0 |
| CuO | 0 | 0 | 0 | 0 | 0 |
| $Co_3O_4/Fe_2O_3$ | 0.16 | — | 0.12 | — | — |
| $(SiO_2 + Al_2O_3 + B_2O_3)/$ $(\Sigma R'_2O + CaO + SrO +$ $BaO + Co_3O_4 + Fe_2O_3)$ | 4.31 | 3.42 | 3.57 | 3.65 | 4.28 |
| Absorption coefficient [$mm^{-1}$] (minimum value at wavelengths of 380 nm to 780 nm) | 0.164 | — | 1.120 | 1.060 | 0.080 |
| Relative value of absorption coefficient (@550 nm/ @600 nm) | 0.791 | — | 0.76 | 1.15 | 0.61 |
| Relative value of absorption coefficient (@450 nm/ @600 nm) | 0.920 | — | 0.73 | 2.21 | 0.17 |
| Plate thickness (mm) | 4.5 | — | 0.7 | 0.7 | 9.1 |
| Absorbance | 0.74 | — | 0.78 | 0.74 | 0.73 |

E37 to E41 = Example 37 to Example 41

In tables 1 to 5, $\Sigma R'_2O$ means "$Na_2O+K_2O+Li_2O$". The absorption coefficient was obtained by the following method. The thickness t of the plate-shaped glass, whose both surfaces were mirror polished, was measured with a vernier caliper. The spectral transmittance T of this glass was measured using an ultraviolet, visible, and near-infrared spectrophotometer (V-570 made by JASCO Corporation). The absorption coefficient β was calculated using a relational expression $T=10^{-\beta t}$. Subsequently, the minimum value of the absorption coefficient at wavelengths of 380 nm to 780 nm was obtained. Further, from the obtained absorption coefficient, the relative values of absorption coefficients (relative value of absorption coefficient (@550 nm/@600 nm) and relative value of absorption coefficient (@450 nm/@600 nm)) were calculated. Further, the absorbance A was calculated using a relational expression $A=-\log_{10}T$.

From the evaluation result of the absorption coefficient, in the glasses of Examples 1 to 37 as working examples, the minimum value of the absorption coefficient at wavelengths of 380 nm to 780 nm is 1 $mm^{-1}$ or more, or the minimum value of the absorbance at wavelengths of 380 nm to 780 nm is 0.7 or more, from which it can be seen that a certain degree or more of light of a wavelength in the visible range is absorbed. By using these glasses for the housing of an electronic device, a high light blocking effect can be obtained.

Further, from the above evaluation result of the absorption coefficient, in part of the glasses of Examples 1 to 37 containing 0.01% to 3% of $Fe_2O_3$, 0.01% to 0.2% of $Co_3O_4$, and 0.05% to 1% of NiO as coloring components, each relative value of the absorption coefficients (relative value of absorption coefficient (@550 nm/@600 nm) and relative value of absorption coefficient (@450 nm/@600 nm)) is within the range of 0.7 to 1.2, from which it can be seen that it is a glass which averagely absorbs light in the visible range. Accordingly, for example, a good gray color tone can be obtained, which is different from brownish gray and bluish gray.

When chemical strengthening is performed on the glass for chemical strengthening according to the embodiments, for example, it is carried out as follows. Specifically, these glasses are each immersed for six hours in a $KNO_3$ molten salt (100%) at approximately 425° C. to chemically strengthen them. When a potassium concentration analysis in a depth direction is performed on each glass, ion exchange occurs at the depth of 5 μm to 100 μm from the surface, and a compressive stress layer is generated.

Chemical strengthening was performed as follows on the glasses of Examples 8, 14, 20, 22 to 25 and 38 from among the above-described examples. Specifically, glasses were prepared in such a manner that 4 mm×4 mm surfaces of these glasses in a shape of 4 mm×4 mm×0.7 mm were mirror finished and other surfaces were #1000 finished. These glasses were each immersed for six hours in a molten salt constituted of $KNO_3$ (99%) and $NaNO_3$ (1%) at approximately 425° C. to chemically strengthen them. Surface compressive stress (CS) and the depth of surface compressive stress layer (DOL) of each glass after the chemical strengthening were measured using a surface stress measurement apparatus. Evaluation results are illustrated in Table 6. Note that the surface stress measurement apparatus is an apparatus utilizing the fact that the surface compressive stress layer formed on a glass surface differs in refractive index from other glass portions in which the surface compressive stress layer does not exist, thereby exhibiting an optical waveguide effect. Further, in the surface stress measurement apparatus, an LED whose central wavelength is 795 nm was used as a light source to perform the measurement.

TABLE 6

|  | E8 | E14 | E20 | E22 | E23 | E24 | E25 | E38 |
|---|---|---|---|---|---|---|---|---|
| Surface compressive stress CS [MPa] | 794 | 784 | 853 | 817 | 797 | 767 | 774 | 607 |
| Depth of surface compressive stress layer DOL [μm] | 42 | 36 | 33 | 41 | 34 | 36 | 39 | 15 |

E8, E14, E20, E22, E23, E24, E25, E38 = Example 8, Example 14, Example 20, Example 22, Example 23, Example 24, Example 25, Example 38

As illustrated in Table 6, in glasses of Examples 8, 14, 20, 22 to 25, under the chemical strengthening condition, a sufficient surface compressive stress and depth of surface compressive stress layer were obtained. As a result, it is conceivable that the glasses of the working examples can obtain a necessary and sufficient strength improving effect by the chemical strengthening. Further, the depth of the surface compressive stress layer of the typical soda lime glass (Example 38) was approximately 15 μm as an example, whereas the depth of the surface compressive stress layer of each glass of Examples 8, 14, 20, 22 to 25 as working examples were 33 μm or more, which were larger than that of the soda lime glass, from which it is presumed that a glass having high strength after the chemical strengthening can be obtained.

In order to confirm color change characteristics due to long term use of the glasses, the following evaluation test was performed. A sample obtained in such a manner that the glass sample of Example 37 was cut into 30 mm square plate shape and both surfaces thereof were optically polished to a predetermined thickness, was disposed at a position of 15 cm from a mercury lamp (H-400P) and irradiated with ultraviolet rays for 100 hours. The spectral transmittance of the sample before and after this light irradiation was measured using an ultraviolet, visible, and near-infrared spectrophotometer (V-570 made by JASCO Corporation), and the absorption coefficient was calculated from the obtained spectral transmittance by using the above-described relational expression.

Then, variations of relative values of absorption coefficients i.e. ΔT (550/600) and ΔT (450/600) represented by following expressions (1) and (2) were calculated from the absorption coefficient of the sample before and after the light irradiation. Evaluation results are illustrated in Table 7.

$$\Delta T(550/600)(\%) = [\{A(550/600) - B(550/600)\}/A(550/600)] \times 100 \quad (1)$$

$$\Delta T(450/600)(\%) = [\{A(450/600) - B(450/600)\}/A(450/600)] \times 100 \quad (2)$$

(In the above expression (1), A(550/600) is a relative value of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a relative value of an absorption coefficient at a wavelength of 550 nm to an absorption coefficient at a wavelength of 600 nm, as calculated from a spectral transmittance curve of the glass before irradiation with the light. In the above expression (2), A(450/600) is a relative value of an absorption coefficient at a wavelength of 450 nm to an absorption coefficient at a wavelength of 600 nm, as calculated from a spectral transmittance curve of the glass after 100-hour irradiation with light of a 400 W high-pressure mercury lamp, and B(450/600) is a relative value of an absorption coefficient at a wavelength of 450 nm to an absorption coefficient at a wavelength of 600 nm, as calculated from a spectral transmittance curve of the glass before irradiation with the light.)

TABLE 7

|  | Example 37 Plate thickness: 0.780 mm | |
|---|---|---|
|  | Before light irradiation | After light irradiation |
| (1) Absorption coefficient at wavelength of 600 nm | 1.100 | 1.108 |
| (2) Absorption coefficient at wavelength of 550 nm | 0.873 | 0.877 |
| (3) Absorption coefficient at wavelength of 450 nm | 1.007 | 1.014 |

TABLE 7-continued

|  | Example 37 Plate thickness: 0.780 mm | |
|---|---|---|
|  | Before light irradiation | After light irradiation |
| Relative value of absorption coefficient (@550 nm/@600 nm) *1 | 0.793 | 0.791 |
| Relative value of absorption coefficient (@450 nm/@600 nm) *2 | 0.916 | 0.915 |
| ΔT (550/600) [%] | −0.30 | |
| ΔT (450/600) [%] | −0.07 | |

*1: calculated from calculating equation of (2)/(1) based on absorption coefficient at each wavelength
*2: calculated from calculating equation of (3)/(1) based on absorption coefficient at each wavelength As illustrated in Table 7, in the glass of Example 37, variations of relative values of absorption coefficients before and after the ultraviolet irradiation i.e. ΔT (550/600) and ΔT (450/600) are both 5% or less in absolute value, from which it can be seen that there will be no color change in glass due to long term use, and an initial appearance color can be maintained for a long period.

Further, the absorption coefficient at wavelengths of 380 nm to 780 nm was also obtained similarly to the above for the glasses after the chemical strengthening, and it was recognized that there was no change from the value before the chemical strengthening in either of them. It was also recognized that there was no change in color tone by visual observation. Thus, the glass for chemical strengthening according to the embodiments can be used for purposes that require strength by chemical strengthening without impairing a desired color tone. Therefore, the range of application can be extended to purposes which are required to have a decorating function.

Further, regarding the glasses of Examples 8 to 11, 13, 14, 16, 19, 20, 23 to 25, 29 to 36 among the glasses illustrated in Table 1 to Table 5, the difference Δa* between chromaticity a* of reflected light by a D65 light source and chromaticity a* of reflected light by an F2 light source in an L*a*b* color system standardized by CIE and the difference Δb* between chromaticity b* of reflected light by the D65 light source and chromaticity b* of reflected light by the F2 light source in the L*a*b* color system were measured. Results are illustrated in Table 8.

TABLE 8

|  | Reflection measurement under D65 light source ... (1) | | | Reflection measurement using F2 light source ... (2) | | | (1) − (2) | | |
|---|---|---|---|---|---|---|---|---|---|
|  | L* | A* | b* | L* | a* | b* | ΔL* | Δa* | Δb* |
| Example 8 | 27.04 | 2.39 | −4.62 | 27.05 | 0.33 | −4.55 | 0.00 | 2.06 | −0.07 |
| Example 9 | 27.53 | −1.56 | 0.89 | 27.62 | −2.06 | 1.06 | −0.09 | 0.50 | −0.17 |
| Example 10 | 29.52 | −2.95 | −0.21 | 29.56 | −3.42 | −0.20 | −0.04 | 0.47 | −0.02 |
| Example 11 | 30.01 | −2.81 | −2.73 | 29.95 | −3.46 | −3.00 | 0.06 | 0.65 | 0.27 |
| Example 13 | 28.87 | −2.00 | −2.59 | 28.82 | −2.68 | −2.88 | 0.05 | 0.69 | 0.28 |
| Example 14 | 26.14 | 0.52 | −3.58 | 26.11 | −0.34 | −3.60 | 0.03 | 0.86 | 0.02 |
| Example 16 | 25.21 | 1.32 | −5.92 | 25.04 | 0.59 | −6.53 | 0.17 | 0.73 | 0.61 |
| Example 19 | 27.50 | −3.37 | 0.89 | 27.49 | −2.87 | 0.94 | 0.01 | −0.50 | −0.04 |
| Example 20 | 25.98 | −0.23 | −2.16 | 25.97 | −0.82 | −2.09 | 0.01 | 0.59 | −0.07 |
| Example 23 | 25.12 | 1.05 | −5.16 | 24.97 | 0.47 | −5.71 | 0.15 | 0.58 | 0.55 |
| Example 24 | 26.25 | 0.27 | −3.05 | 26.25 | −0.58 | −3.03 | 0.00 | 0.84 | −0.02 |
| Example 25 | 26.53 | 0.54 | −3.47 | 26.53 | −0.41 | −3.47 | 0.00 | 0.95 | 0.00 |
| Example 29 | 29.21 | −2.06 | −0.41 | 29.32 | −2.77 | −0.28 | −0.11 | 0.71 | −0.13 |
| Example 30 | 28.79 | −2.42 | −1.39 | 28.65 | −3.09 | −1.68 | 0.14 | 0.67 | 0.28 |
| Example 31 | 28.80 | −2.31 | −1.35 | 28.72 | −2.95 | −1.58 | 0.08 | 0.63 | 0.23 |
| Example 32 | 28.83 | −2.14 | −1.57 | 28.79 | −2.78 | −1.78 | 0.05 | 0.64 | 0.21 |

TABLE 8-continued

|  | Reflection measurement under D65 light source ... (1) | | | Reflection measurement using F2 light source ... (2) | | | (1) − (2) | | |
|---|---|---|---|---|---|---|---|---|---|
|  | L* | A* | b* | L* | a* | b* | ΔL* | Δa* | Δb* |
| Example 33 | 28.96 | −2.35 | −0.18 | 29.02 | −2.88 | −0.14 | −0.05 | 0.53 | −0.05 |
| Example 34 | 28.68 | −2.01 | −0.83 | 28.72 | −2.63 | −0.88 | −0.04 | 0.61 | 0.05 |
| Example 35 | 27.99 | −1.80 | −1.15 | 28.00 | −2.39 | −1.25 | −0.01 | 0.59 | 0.10 |
| Example 36 | 28.04 | −1.85 | −1.11 | 28.05 | −2.46 | −1.19 | −0.01 | 0.61 | 0.08 |

Δa* and Δb* were obtained by the following method. A spectro-colorimeter (Colori7 made by X-Rite, Inc.) was used to measure reflected chromaticity of each of the D65 light source and the F2 light source of each glass, and measurement results were used to calculate Δa* and Δb*. Note that on a rear face side (the rear face of a face irradiated with light from the light source) of the glass, a white resin plate was placed to perform measurement.

As illustrated in Table 8, in the glasses of Examples 9 to 11, 13, 14, 16, 19, 20, 23 to 25, and 29 to 36 containing a certain amount of CuO or $Fe_2O_3$, both Δa* and Δb* are less than one in absolute value, and it can be seen that a glass having low metamerism can be obtained. In this respect, in the glass of Example 8 which also contains no CuO and in which the content of $Fe_2O_3$ is also less than 0.1 mole %, the absolute value of Δa* is larger than one, and the effect of suppressing metamerism could not be obtained sufficiently.

In order to confirm radio wave transparency of the glasses, the following evaluation test was performed. First, the glass of Example 8 was cut out and processed to have a size 50 mm×50 mm×0.8 mm, and their main surface was polished to be in a mirror state. This glass was measured for a dielectric loss tangent at frequencies of 50 MHz, 500 MHz, 900 MHz, 1.0 GHz by a volumetric method (parallel flat plate method) using an LCR meter and electrodes. Measurement results are illustrated in Table 9. Note that the dielectric constant (c) of the glasses at the frequency of 50 MHz was 7.6.

TABLE 9

| Frequency | Example 8 tan δ |
|---|---|
| 50 MHz | 0.006 |
| 500 MHz | 0.006 |
| 900 MHz | 0.005 |
| 1.0 GHz | 0.004 |

As illustrated in Table 9, in the glass of Example 8, the dielectric loss tangent at frequencies in the range of 50 MHz to 1.0 GHz is less than 0.01, and it can be seen that it has favorable radio wave transparency.

Regarding the number of bubbles, to confirm the effect of $Fe_2O_3$ and $Co_3O_4$, the glass components and contents other than $Fe_2O_3$ and $Co_3O_4$ were assumed to be the same, and the number of bubbles was checked for each one containing both $Fe_2O_3$ and $Co_3O_4$, each one containing only $Fe_2O_3$, and each one containing only $Co_3O_4$. Note that the glass of Example 40 is one omitting only $Co_3O_4$ from the glass of Example 39. Further, the glass of Example 41 is one omitting only $Fe_2O_3$ from the glass of Example 39.

Regarding the number of bubbles, the number of bubbles of an area of 0.6 $cm^3$ was measured at four positions on the aforementioned plate-shaped glass under a high-intensity light source (LA-100T made by Hayashi Watch-works), and a value converted from the average value of measurement values therefrom in unit volume ($cm^3$) was presented.

The number of bubbles is largely affected by a parent composition and a melting temperature of the glass, and hence, as described above, the components and contents other than $Fe_2O_3$ and $Co_3O_4$ were assumed to be the same, and comparison of ones at the same melting temperatures was performed. Results are illustrated in Table 10.

TABLE 10

|  | Contains $Fe_2O_3$ and $Co_3O_4$ | Contains only $Fe_2O_3$ | Contains only $Co_3O_4$ |
|---|---|---|---|
|  | Example 39 | Example 40 | Example 41 |
| Number of Bubbles [bubbles/$cm^3$] Melting temperature: 1500° C. | 42 | 65 | 59 |

From these results, the glass of Example 39 containing both $Fe_2O_3$ and $Co_3O_4$ had a small number of bubbles as compared to the glass of Example 40 containing $Fe_2O_3$ but not containing $Co_3O_4$ and the glass of Example 41 containing $Co_3O_4$ but not containing $Fe_2O_3$. This supports that coexisting $Co_3O_4$ and $Fe_2O_3$ exhibit a refining effect at the time of melting of the glass. Specifically, it is conceivable that, since $O_2$ bubbles released when trivalent Fe turns to bivalent Fe in a high temperature state are absorbed when cobalt oxidizes, the $O_2$ bubbles are reduced as a result, thereby obtaining the refining effect.

According to the present invention, a glass having excellent bubble quality and having a gray-based color tone can be obtained stably while lowering its environmental load. Further, a glass for chemical strengthening preferred for refining with sulfate can be obtained. The glass of the present invention is also able to be chemical strengthened, and can be used preferably for purposes that require a small thickness and high strength, for example, decorative purposes. Further, in the glass for chemical strengthening of the present invention, breakage due to a crack does not easily occur, and hence a glass having high strength can be made. The glass of the present invention also excels in press formability, and can be processed in a desired shape required for housing purposes or the like at low cost.

The glass of the present invention can be used for decorations of an operating panel of an audiovisual apparatus, office automation apparatus, or the like, an opening/closing door, an operating button/knob of the same product, or the like, or a decorative panel disposed around a rectangular display surface of an image display panel of a digital photo frame, TV, or the like, and for a glass housing for an electronic device, and the like. It can also be used for an automobile interior member, a member of furniture or the like, a building material used outdoors or indoors, or the like.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A glass for chemical strengthening, comprising, in mole percentage based on following oxides, 55% to 80% of $SiO_2$, 3% to 16% of $Al_2O_3$, 0% to 12% of $B_2O_3$, 5% to 16% of $Na_2O$, 0% to 4% of $K_2O$, 0% to 15% of MgO, 0% to 3% of CaO, 0% to 18% of $\Sigma RO$, where R represents Mg, Ca, Sr, Ba or Zn, 0% to 1% of $ZrO_2$, 0.01% to 0.2% of $Co_3O_4$, 0.05% to 1% of NiO, and 0.01% to 3% of $Fe_2O_3$, wherein a content ratio $Co_3O_4/Fe_2O_3$ is 0.05 or more.

2. The glass for chemical strengthening according to claim 1, further comprising 0.005% to 3% of a color correcting component comprising at least one metal oxide selected from the group consisting of oxides of Ti, Cu, Ce, Er, Nd, Mn and Se.

3. The glass for chemical strengthening according to claim 1, further comprising 0.1% to 1% of $TiO_2$.

4. The glass for chemical strengthening according to claim 1, further comprising 0.1% to 3% of CuO.

5. The glass for chemical strengthening according to claim 1, further comprising 0.005% to 2% of a color correcting component comprising at least one metal oxide selected from the group consisting of oxides of Ce, Er, Nd, Mn and Se.

6. The glass for chemical strengthening according to claim 1, wherein the content ratio $Co_3O_4/Fe_2O_3$ is 0.05 to 0.5.

7. The glass for chemical strengthening according to claim 1, wherein a content ratio $(SiO_2+Al_2O_3+B_2O_3)/(\Sigma R'_2O+CaO+SrO+BaO+Fe_2O_3+Co_3O_4)$ is 3 or more, where R' represents Na, K or Li.

8. The glass for chemical strengthening according to claim 1, further comprising 0.005% to 0.5% of $SO_3$.

9. The glass for chemical strengthening according to claim 1, further comprising 0.005% to 1% of $SnO_2$.

10. The glass for chemical strengthening according to claim 1, wherein a ratio of an absorption coefficient at a wavelength of 550 nm to an absorption coefficient at a wavelength of 600 nm, as calculated from a spectral transmittance curve of the glass and a ratio of an absorption coefficient at a wavelength of 450 nm to the absorption coefficient at the wavelength of 600 nm, as calculated from the spectral transmittance curve of the glass are both within a range of 0.7 to 1.2.

11. The glass for chemical strengthening according to claim 1, wherein absolute values of variation $\Delta T$ (550/600) and variation $\Delta T$ (450/600) expressed by expressions (1) and (2) are 5% or less:

$$\Delta T(550/600)(\%)=[\{A(550/600)-B(550/600)\}/A(550/600)]\times 100 \quad (1); \text{ and}$$

$$\Delta T(450/600)(\%)=[\{A(450/600)-B(450/600)\}/A(450/600)]\times 100 \quad (2)$$

where in the expression (1), A(550/600) is a ratio of an absorption coefficient at a wavelength of 550 nm to an absorption coefficient at a wavelength of 600 nm, as calculated from a spectral transmittance curve of the glass after 100-hour irradiation with light of a 400 W high-pressure mercury lamp, and B(550/600) is a ratio of an absorption coefficient at the wavelength of 550 nm to an absorption coefficient at the wavelength of 600 nm, as calculated from a spectral transmittance curve of the glass before irradiation with the light; in the expression (2), A(450/600) is a ratio of an absorption coefficient at a wavelength of 450 nm to the absorption coefficient at the wavelength of 600 nm, as calculated from the spectral transmittance curve of the glass after 100-hour irradiation with light of the 400 W high-pressure mercury lamp, and B(450/600) is a ratio of an absorption coefficient at the wavelength of 450 nm to the absorption coefficient at the wavelength of 600 nm, as calculated from the spectral transmittance curve of the glass before irradiation with the light.

12. The glass for chemical strengthening according to claim 1,
wherein an absolute value of a difference $\Delta a^*$ between chromaticity $a^*$ of reflected light by a D65 light source and chromaticity $a^*$ of reflected light by an F2 light source in an $L^*a^*b^*$ color system, the absolute value of a difference $\Delta a^*$ being expressed by expression (I), and an absolute value of a difference $\Delta b^*$ between chromaticity $b^*$ of reflected light by the D65 light source and chromaticity $b^*$ of reflected light by the F2 light source in the $L^*a^*b^*$ color system, the absolute value of a difference $\Delta b^*$ being expressed by expression (II), are both 1 or less:

$$\Delta a^* = a^* \text{value}(D65 \text{ light source}) - a^* \text{value}(F2 \text{ light source}) \quad (I); \text{ and}$$

$$\Delta b^* = b^* \text{value}(D65 \text{ light source}) - b^* \text{value}(F2 \text{ light source}) \quad (II).$$

13. The glass for chemical strengthening according to claim 1,
wherein when an indentation is formed by using a Vickers indenter in a mirror-finished surface of a glass plate having a thickness of 1 mm made of the glass, a load of the Vickers indenter that causes a crack occurrence rate to be 50% is 150 gf or more.

14. A chemical strengthened glass obtained by chemically strengthening the glass according to claim 1,
wherein a depth of a surface compressive stress layer formed in a surface of the chemical strengthened glass is 30 μm or more, and a surface compressive stress of the surface compressive stress layer is 550 MPa or more.

15. The glass for chemical strengthening according to claim 1,
wherein the content ratio $Co_3O_4/Fe_2O_3$ is 0.3 or less.

* * * * *